United States Patent
Chen

(10) Patent No.: US 11,949,843 B1
(45) Date of Patent: Apr. 2, 2024

(54) SYSTEM AND METHOD FOR ENHANCING THREE-DIMENSIONAL (3D) DEPTH ACQUISITION

(71) Applicant: Meta Platforms, Inc., Menlo Park, CA (US)

(72) Inventor: Shenchang Eric Chen, Los Gatos, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/827,704

(22) Filed: May 28, 2022

Related U.S. Application Data

(60) Provisional application No. 63/209,115, filed on Jun. 10, 2021.

(51) Int. Cl.
H04N 13/122 (2018.01)
H04N 13/254 (2018.01)

(52) U.S. Cl.
CPC ......... *H04N 13/122* (2018.05); *H04N 13/254* (2018.05)

(58) Field of Classification Search
CPC ........................... H04N 13/122; H04N 13/254
USPC .......................................................... 348/43
See application file for complete search history.

(56) References Cited

U.S. PATENT DOCUMENTS

| | | | | |
|---|---|---|---|---|
| 2004/0183940 | A1* | 9/2004 | Raskar | G06T 15/02 |
| | | | | 348/E5.029 |
| 2018/0232899 | A1* | 8/2018 | Lansel | H04N 23/56 |

OTHER PUBLICATIONS

Terry., "Introduction of Dual-Lens Systems in Cameras," Reolink, Aug. 9, 2022, 11 pages, Retrieved from the Internet: URL: https://reolink.com/blog/dual-lens-system-in-cameras/.
Ulrich L., et al., "Analysis of RGB-D Camera Technologies for Supporting Different Facial Usage Scenarios," Multimedia Tools and Applications, Aug. 11, 2020, 24 pages, Retrieved from the Internet: URL: https://d-nb.info/1218970480/34.
Wikipedia, "Intel RealSense," [Retrieved on Sep. 20, 2022], 8 pages, Retrieved from the Internet: URL: https://en.wikipedia.org/wiki/Intel_RealSense.
Wikipedia, "Laser Scanning," [Retrieved on Sep. 20, 2022], 4 pages, https://en.wikipedia.org/wiki/Laser_scanning.
Wikipedia, "Photometric Stereo," [Retrieved on Sep. 20, 2022], 4 pages, https://en.wikipedia.org/wiki/Photometric_stereo.

(Continued)

*Primary Examiner* — Christopher S Kelley
*Assistant Examiner* — Ana Picon-Feliciano
(74) *Attorney, Agent, or Firm* — FREESTONE INTELLECTUAL PROPERTY LAW PLLC; Aaron J. Visbeek

(57) ABSTRACT

In some embodiments, a computer-implemented method includes capturing an image for each flash unit of an electronic device, each image being illuminated during the capturing of the image; obtaining a normalized image from one or more of the illuminated images; and using an illumination-based optimization framework to generate an enhanced three-dimensional (3D) depth image, the illumination-based optimization framework being based on the illuminated image. In some embodiments of the computer-implemented method, the illumination-based optimization framework incorporates the normalized image and 3D depth data associated with the captured image into the generation of the enhanced 3D depth image.

8 Claims, 7 Drawing Sheets

(56) References Cited

OTHER PUBLICATIONS

Wikipedia, "PrimeSense," [Retrieved on Sep. 20, 2022], 7 pages, Retrieved from the Internet: URL: https://en.wikipedia.org/wiki/PrimeSense.
Wikipedia, "Structured-Light 3D Scanner," [Retrieved on Sep. 20, 2022], 8 pages, Retrieved from the Internet: URL: https://en.wikipedia.org/wiki/Structured-light_3D_scanner.
Wikipedia, "Time-of-Flight Camera," [Retrieved on Sep. 20, 2022], 13 pages, Retrieved from the internet: URL: https://en.wikipedia.org/wiki/Time-of-flight_camera.

* cited by examiner

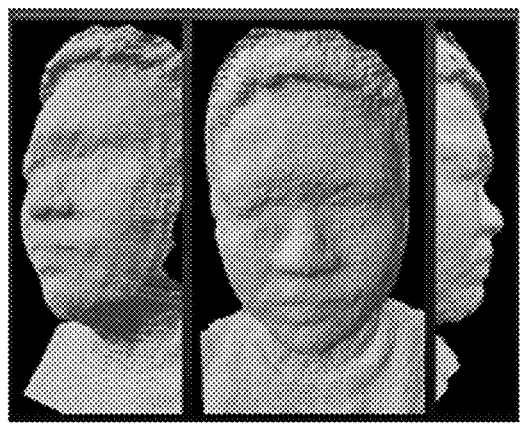 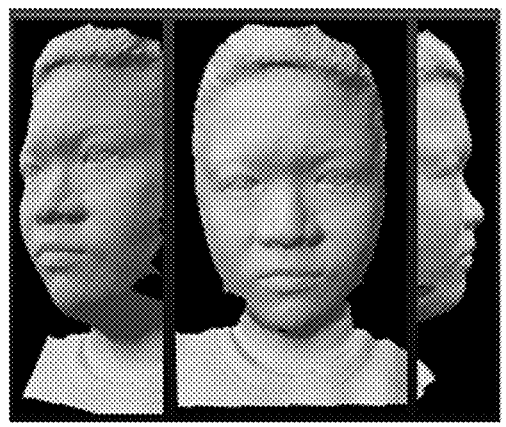
*FIG. 5A*                    *FIG. 5B*

SYSTEM AND METHOD FOR ENHANCING THREE-DIMENSIONAL (3D) DEPTH ACQUISITION

CROSS-REFERENCE TO RELATED APPLICATION

The present Application claims the benefit of U.S. Provisional Application No. 63/209,115 entitled "Enhancing 3D Depth Acquisition Using Flash Units On Mobile Devices" filed Jun. 10, 2021. U.S. Provisional Application No. 63/209,115 is expressly incorporated herein by reference in its entirety.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Mobile devices equipped with three-dimensional (3D) sensors have become increasingly popular for use in the everyday activity of mobile device users. The 3D sensors may be used for measuring the dimensions of the insides of buildings, creating 3D models, customizing tailored clothing, taking 3D selfies, customizing 3D parts, and for other 3D applications not yet imagined. However, high quality 3D scanning generally requires expensive laboratory equipment or software not often attainable by ordinary mobile device users.

Recently, in addition to two-dimensional (2D) cameras, many commercial mobile devices include the 3D sensors, which generate images with depth, or distance, in addition to the color information provided by the cameras. Integration of the 3D sensors with traditional mobile devices require that such 3D sensors be small, inexpensive, and easy to integrate with other hardware components. Such 3D sensors often sacrifice quality in order to produce 3D models and have inadequate 3D sensing capabilities for many 3D applications.

BRIEF DESCRIPTION OF THE DRAWINGS

FIG. 1B is mounted on a tripod and utilized to generate an enhanced 3D depth image of the human subject of FIG. 2A in accordance with some embodiments.

FIG. 5A illustrates a visual example of a 3D depth image derived from a passive stereo approach.

FIG. 5B illustrates a visual example of improvement to a 3D depth image produced by the method of FIGS. 4A and 4B using the device of FIG. 1A or FIG. 1B in accordance with some embodiments.

DETAILED DESCRIPTION

Figure 1A:
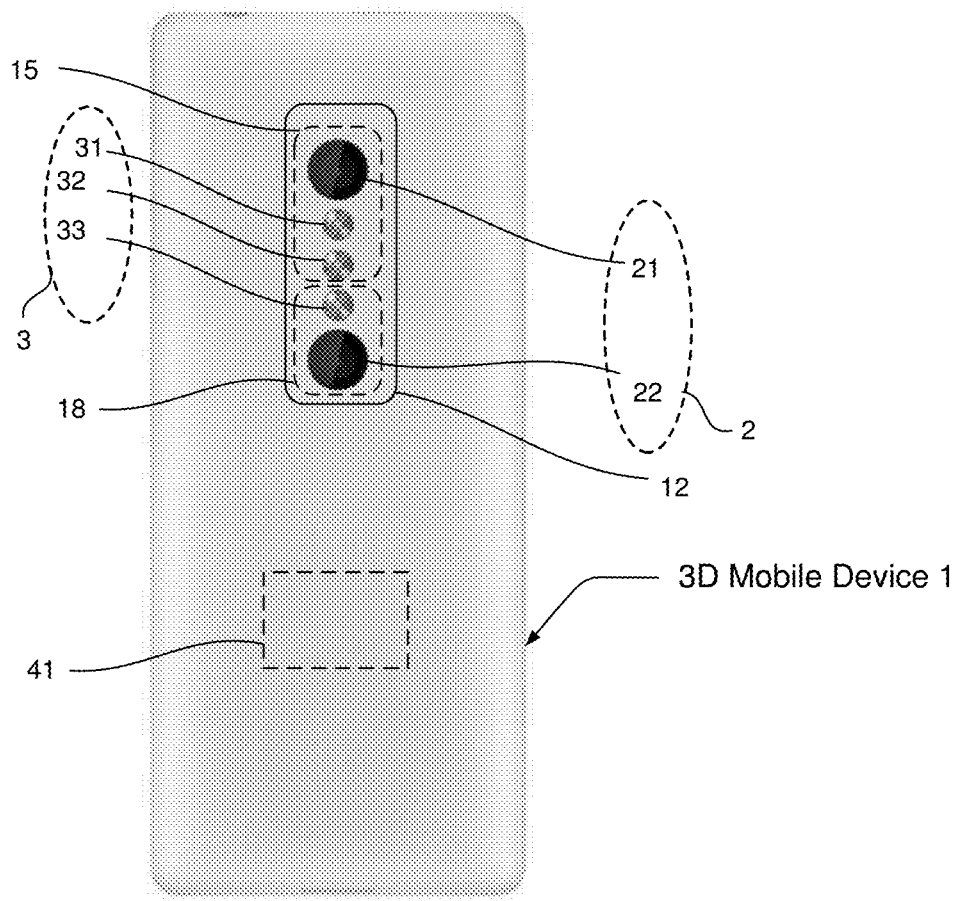
FIG. 1A illustrates a mobile device configured to generate an enhanced three-dimensional (3D) depth image in accordance with some embodiments.

As used herein the following terms have the meanings given below.

In some embodiments, a mobile device may refer to a computing device or an electronic device with two-dimensional (2D) and three-dimensional (3D) digital image capturing capabilities. In some embodiments, the mobile device includes an image capturing device, such as a camera, that is configured to capture the 2D and 3D digital images. In some embodiments, the image capturing device may be operated by a user of the mobile device. In some embodiments, the mobile device may be, for example, a smartphone, a tablet, a laptop, a camera, or the like.

In some embodiments, a 3D image, a depth image, or 3D depth image may refer to a two-dimensional (2D) image that includes 3D depth information, in addition to color information for a field of view. In some embodiments, the depth image may be provided as a rectangular grid, frame, or array of pixels, typically with RGB (color) and D (depth) information for each pixel. In some embodiments, depth information may be characterized using, for example, millimeters of distance from a camera to an object. In some embodiments, depth data may also indicate whether a pixel is closer than a minimum range value or farther than a maximum range value.

In some embodiments, a depth camera, also known as depth sensing camera, may refer to an image capturing device or camera configured to capture 3D depth images. In some embodiments, a mobile device, such as, for example, mobile device 1 or mobile device 10, may include a depth camera.

In some embodiments, a camera subsystem, such as, for example, camera subsystem 15, may refer to a combination of optical element/s, sensor/s and processing element/s that are included in a mobile device, such as, for example, mobile device 1 or mobile device 10, that enable the mobile device 1 to act as an image capturing device and capture standard color images. In some embodiments, the camera subsystem or standard camera subsystem may have a single lens and sensor, dual lenses and sensors, or other arrangements of optical elements and sensors to enable the mobile device or camera subsystem to take or capture conventional photographic digital images.

In some embodiments, a 3D subsystem, such as, for example, 3D subsystem 18, may refer to a combination of optical elements, such as, a lens or infrared emitter, sensor/s, and processing element/s that may be added to, or incorporated into an electronic device or mobile device, such as, for example, mobile device 1, to enable the mobile device to capture 3D depth images.

In some embodiments, a user may refer to a person that operates a mobile device, such as, for example, mobile device 1 or mobile device 10.

In some embodiments, a 3D mobile device or 3D mobile phone, may refer to a mobile device, such as, for example, mobile device 1 or mobile device 10, that incorporates a 3D subsystem that enables the 3D mobile device to capture 3D depth images.

In some embodiments, the operation of certain aspects of embodiments are described herein with respect to FIGS. 1A-6.

FIG. 1A illustrates a mobile device 1 in accordance with some embodiments. In some embodiments, the mobile device 1 is configured to generate an enhanced three-dimensional (3D) image in accordance with some embodiments. In some embodiments, the mobile device 1 includes an image capturing device 12 and an illumination-based 3D enhancement system 41. In some embodiments, the illumination-based 3D enhancement system 41 includes processors and/or processing techniques, methods, and instructions internal or external to mobile device 1 that are configured to generate the enhanced 3D depth image. In some embodiments, the image capturing device 12 includes a camera subsystem 15 and a 3D subsystem 18. In some embodiments, the camera subsystem 15 is configured to capture digital images for the mobile device 1. In some embodiments, 3D subsystem 18 is configured to capture 3D depth data associated with the image captured by camera subsystem 15. In some embodiments, the camera subsystem 15 includes a lens 21, a flash unit 31, and a flash unit 32. In some embodiments, the 3D subsystem 18 includes a lens 22 and a flash unit 33. In some embodiments, a flash unit is an illumination device configured to illuminate an image captured by mobile device 1 (or mobile device 10 of FIG. 1B). In some embodiments, a flash unit may be, for example, a light emitting diode (LED), or other type of light emitting source configured to illuminate the images captured by mobile device 1. In some embodiments, the 3D subsystem 18 may include one of the two lenses 2 and one or two of flash units 3. In some embodiments, the 3D subsystem 18 may include additional specialized sensors and processors configured to generate the enhanced 3D depth images generated by mobile device 1 using the methods described herein.

In some embodiments, the camera subsystem 15 is configured to capture images illuminated by flash units 3 and ambient lighting provided in the environment of the image. In some embodiments, as stated previously, the 3D subsystem 18 is configured to generate 3D depth data associated with the images captured by the camera subsystem 15. In some embodiments, the 3D subsystem 18 may be, for example, a passive stereo sensing system, structured light sensing system, a time-of-flight sensing system, or other base 3D sensing systems configured to generate the 3D depth data that is enhanced using the methods described herein.

In some embodiments, the illumination-based 3D enhancement system 41 is configured to utilize the camera subsystem 15 and the 3D subsystem 18 as part of an illumination-based optimization framework (described further herein with reference to FIGS. 1A-4B and FIGS. 5B-6) to generate the enhanced 3D depth image output by the mobile device 1. In some embodiments, in order to utilize the illumination-based optimization framework to generate the enhanced 3D depth images, the mobile device 1 is configured to utilize the camera subsystem 15 to capture images in various illumination environments. In some embodiments, the illumination environments may include, for example, a flash-based illumination environment, an ambient-based illumination environment, or a combination of both the flash-based illumination environment and the ambient-based illumination environment. In some embodiments, the flash-based illumination environment may include one or more lighting conditions in which the flash units 3 illuminate the environment (which may include ambient lighting) in the image captured by mobile device 1. In some embodiments, the ambient-based illumination environment may include one or more lighting conditions in which ambient lighting (without flash) illuminates the environment in the image captured by mobile device 1. In some embodiments, the ambient lighting is, for example, natural ambient lighting associated with sunlight illuminating from the sun or room lights illuminating from lightbulbs. In some embodiments, the sunlight and room light may be illuminating from a direction different than the direction of the lights illuminating from the flash units mounted on the mobile device. In some embodiments, mobile device 1 utilizes the ambient light as a source of information that may be used to enhance the quality of the 3D depth images output by mobile device 1. In some embodiments, as explained in further detail with reference to the methods described herein, the one or more lighting conditions are utilized by mobile device 1 to generate the enhanced 3D depth images. In some embodiments, utilizing the lighting conditions of the ambient illumination environment allows at least one less flash unit to be included on the mobile device 1, as the lighting in the ambient illumination is used in the generation of a normal image that is utilized to generate the enhanced 3D depth image (described further in detail below with reference to FIG. 3 and FIGS. 4A and 4B).

In some embodiments, a series of stages may be described herein that include, for example, the components utilized to obtain data to generate the enhanced 3D depth images, the methods utilized to obtain orientation data and the surface normal direction at each pixel in the image to generate the enhanced 3D depth images, and the methods utilized to combine base depth data from the 3D subsystem 18 with orientation data from the camera subsystem 15 to generate the enhanced 3D depth images illustrated in FIG. 5B.

Figure 1B:
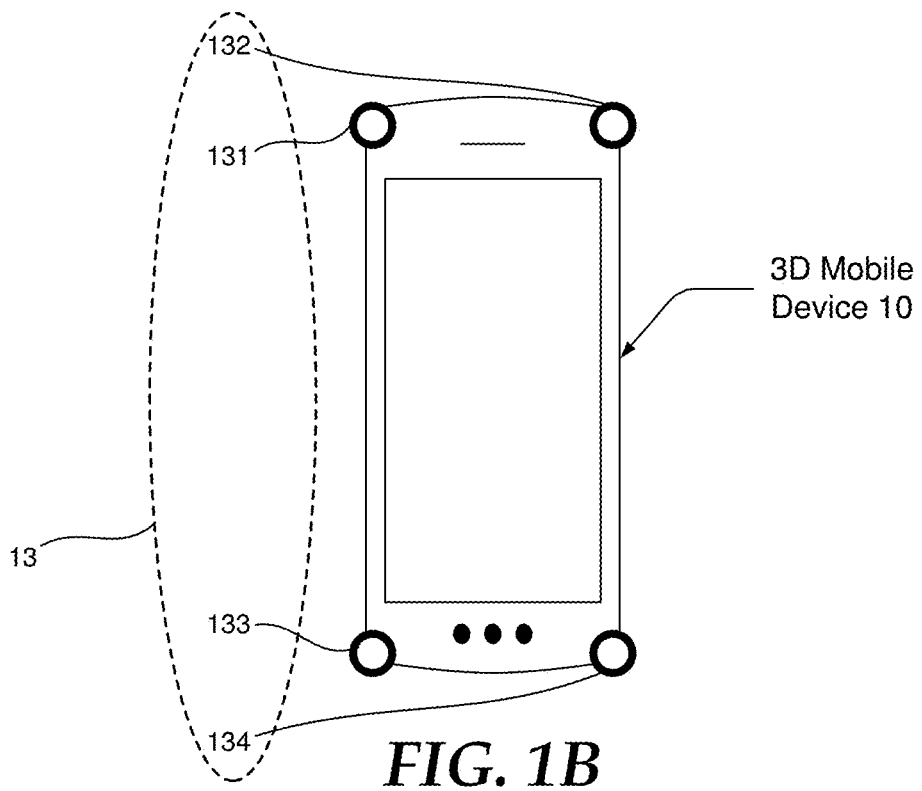
FIG. 1B illustrates a mobile device configured to generate an enhanced 3D depth image in accordance with some embodiments.

FIG. 1B illustrates a mobile device 10 in accordance with some embodiments. In some embodiments, the mobile device 10 is configured to generate an enhanced 3D depth image using the methods described herein. In some embodiments, in addition to including a camera subsystem, a 3D subsystem, and an illumination-based 3D enhancement system, as illustrated in FIG. 1A, the mobile device 10 includes additional flash units 13 that are mounted on the periphery of the mobile device 10. In some embodiments, the additional flash units 13 are configured to capture images and generate 3D depth data that is utilized to generate the enhanced 3D depth images output by the mobile device 10. In some embodiments, the flash units 13 include a flash unit 131, a flash unit 132, a flash unit 133, and a flash unit 134. In some embodiments, as is the case for the flash units 3 in FIG. 1A, flash units 13 may be LED flash units. In some embodiments, the mobile device 10 is configured to act as a depth camera or 3D camera using the four externally mounted flash units 13. In some embodiments, flash units 13 may be integrated into a mobile phone case (not depicted) that is external to mobile device 10 and electronically coupled to mobile device 10 via a USB port or the like. In some embodiments, mobile device 10 is configured to utilize the camera subsystem, the 3D subsystem, the flash units 13, the illumination-based 3D enhancement system, and the methods described herein to generate the enhanced 3D depth images output by the mobile device 10 and illustrated by way of example in FIG. 5B.

Figure 2A:
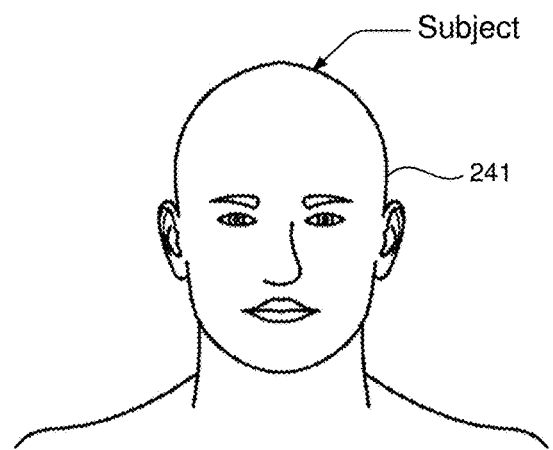
FIG. 2A illustrates an example visualization of a human subject whose enhanced 3D depth image is generated using the mobile device of FIG. 1A or FIG. 1B.
Figure 2B:
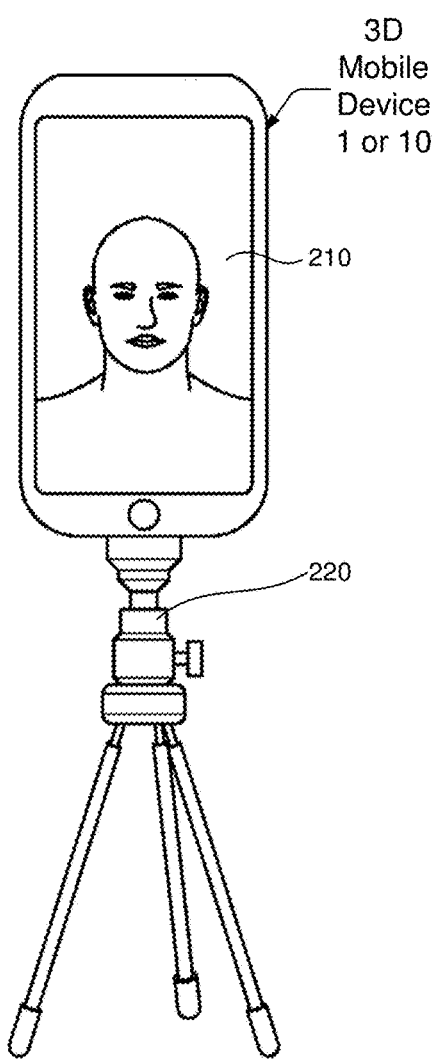
FIG. 2B illustrates an example environment in which a mobile device of FIG. 1A

FIG. 2A illustrates an example visualization of a human subject 241 whose enhanced 3D depth image is generated using the mobile device 1 of FIG. 1A or mobile device 10 of FIG. 1B in accordance with some embodiments. FIG. 2B illustrates an example environment in which the mobile device 1 of FIG. 1A or the mobile device 10 of FIG. 1B is mounted on a tripod and utilized to generate an enhanced 3D depth image of the human subject 241 of FIG. 2A in accordance with some embodiments. In some embodiments, mobile device 1 or mobile device 10 includes a rear-facing display 210. In some embodiments, in FIGS. 2A-2B, the human subject 241 is being photographed by a user of either mobile device 1 or mobile device 10 to generate enhanced 3D depth images utilizing the methods described herein.

Figure 3:
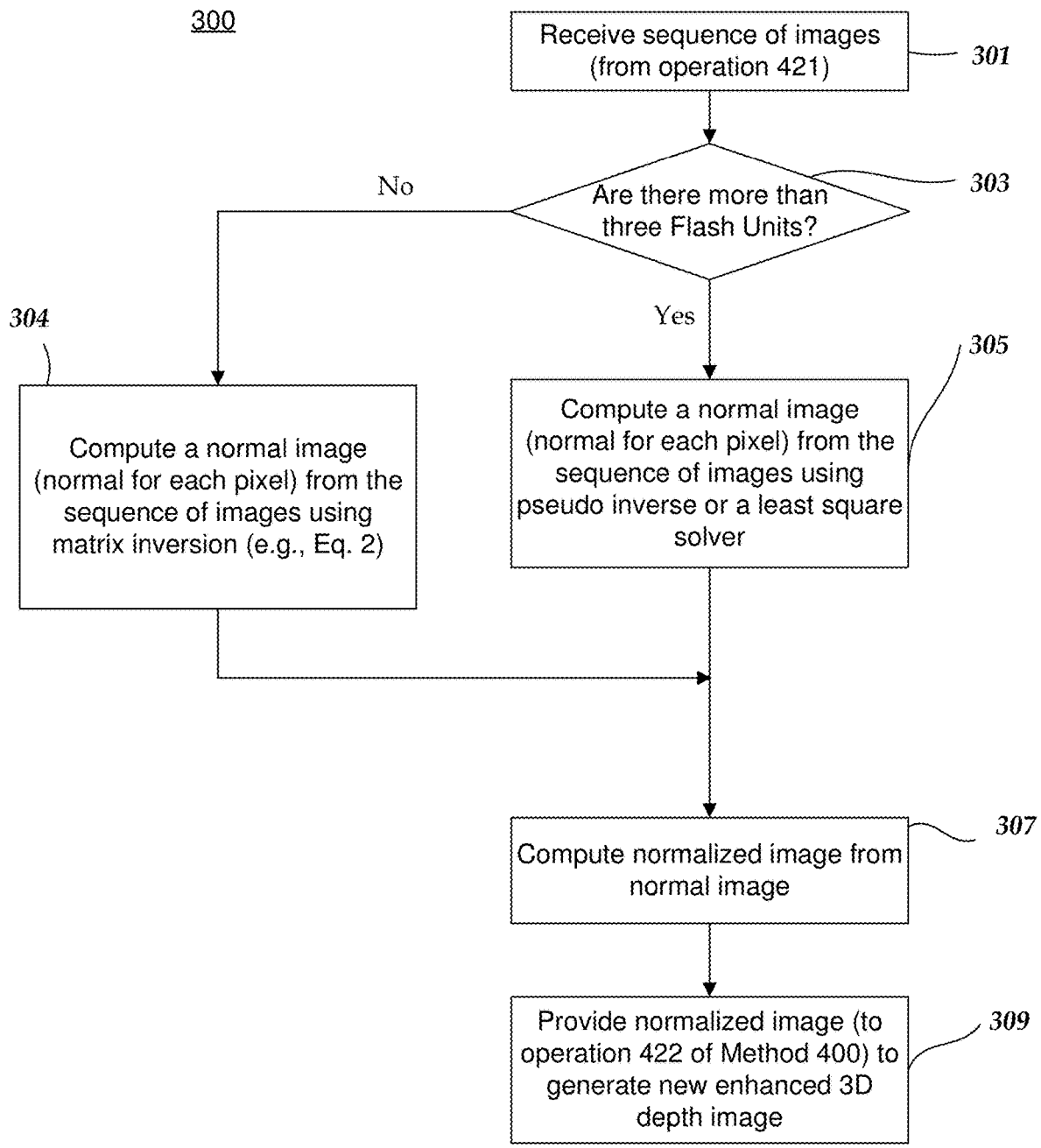
FIG. 3 illustrates a method for generating a normalized image in accordance with some embodiments.

FIG. 3 is a flow diagram illustrating a method 300 in accordance with some embodiments. In some embodiments, the method 300 is utilized to generate a normalized image from a sequence of images captured by a mobile device using method 400 of FIG. 4A and FIG. 4B in accordance with some embodiments. In some embodiments, the method, process steps, or stages illustrated in the figures may be implemented as an independent routine or process, or as part of a larger routine or process. Note that each process step or stage depicted may be implemented as an apparatus that includes a processor executing a set of instructions, a method, or a system, among other embodiments. In some embodiments, the order of some of the steps may vary or be interchangeable. In some embodiments, as described further herein with reference to FIG. 4A and FIG. 4B, the sequence of images utilized by method 300 to generate the normalized image are captured in a flash-based illumination environment using the flash units of the mobile device and/or in an ambient-based illumination environment using the ambient lighting of the environment of the images captured using the mobile device.

Figure 4A:
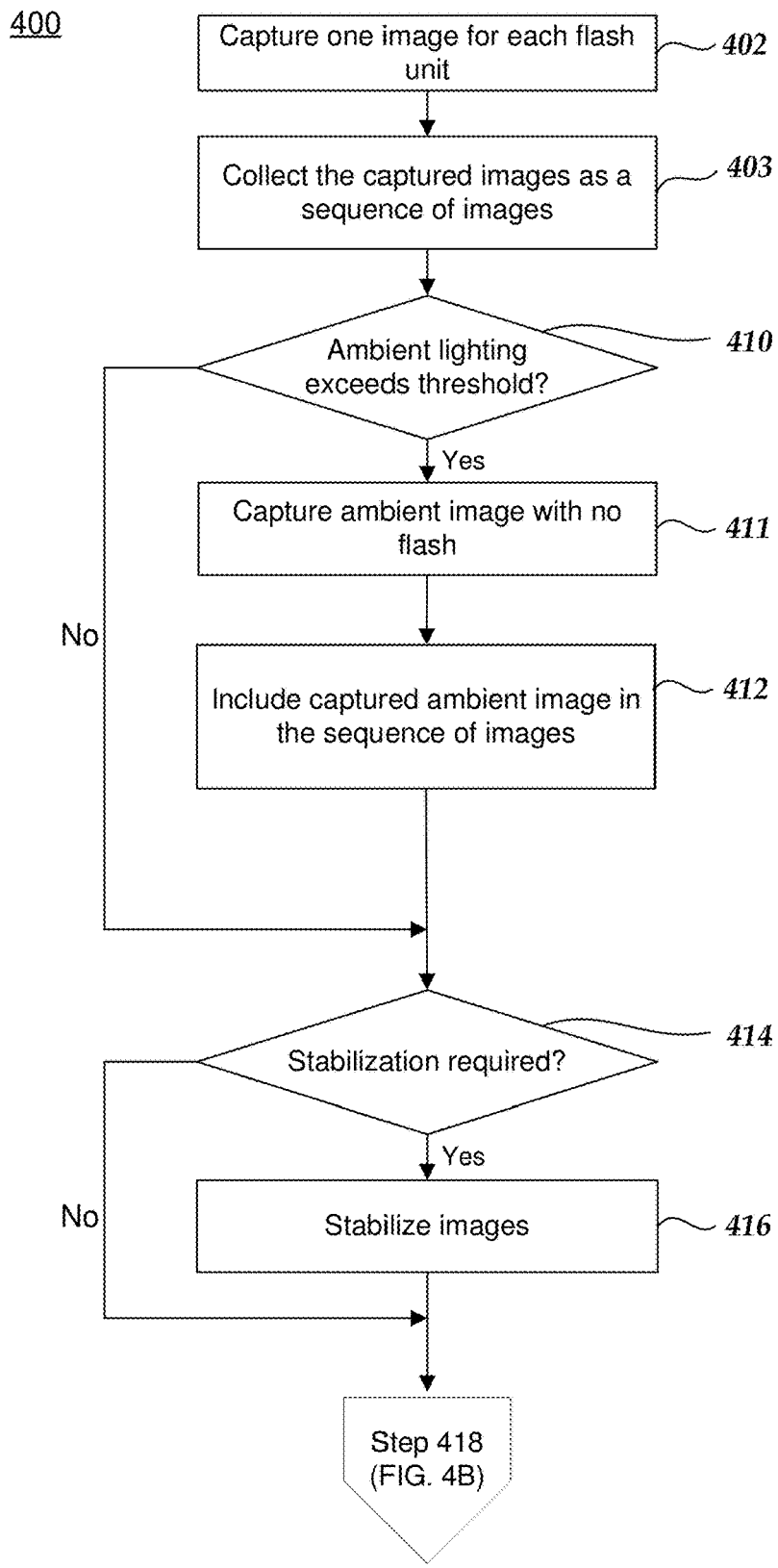
FIGS. 4A-4B illustrate a flow diagram that illustrates a method for generating an enhanced 3D depth image in accordance with some embodiments.
Figure 4B:
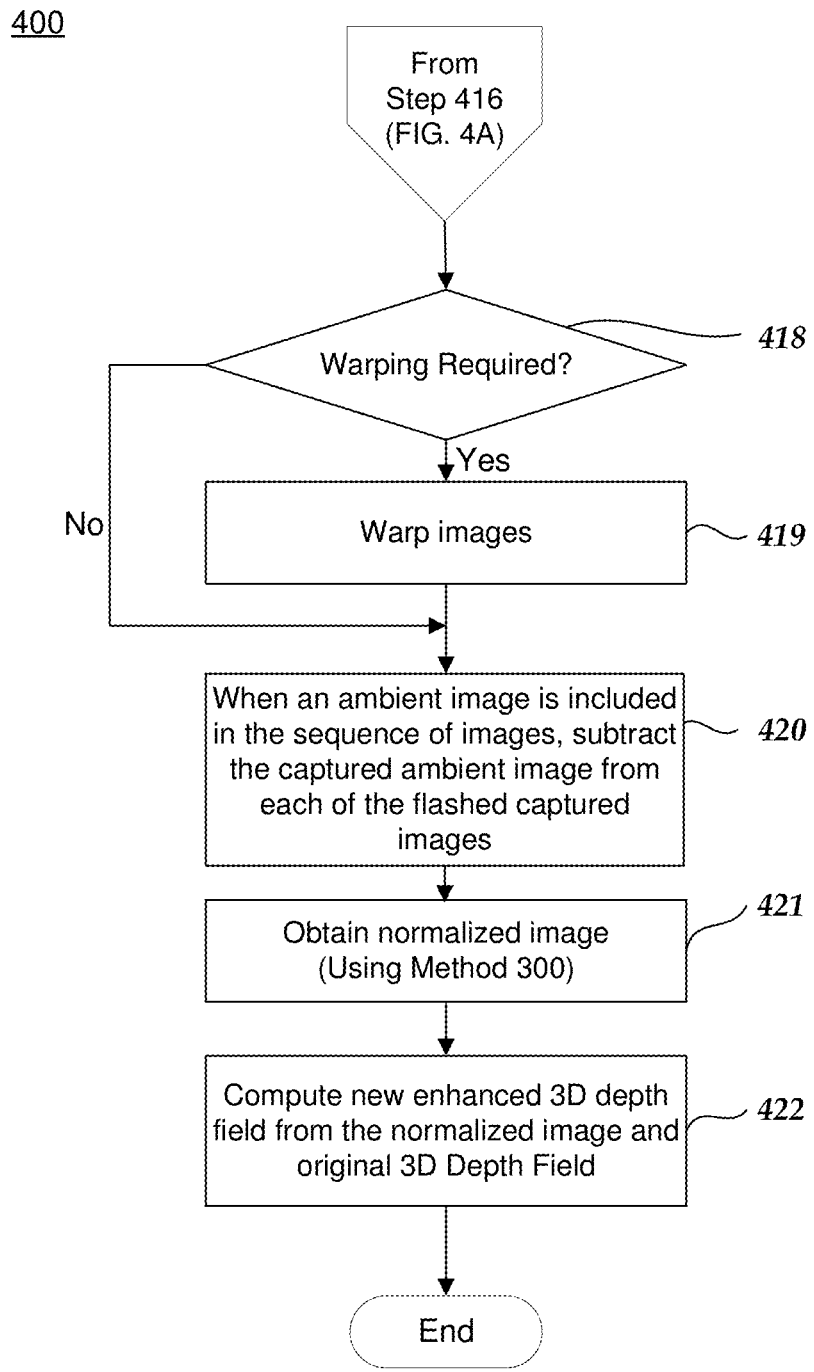

FIG. 4A and FIG. 4B are flow diagrams illustrating a method 400 in accordance with some embodiments. In some embodiments, the method 400 is configured to generate an enhanced 3D depth image utilizing mobile device 1 or mobile device 10 in accordance with some embodiments. In some embodiments, the method 400 is configured to generate an enhanced 3D depth field that corresponds to the enhanced 3D depth image in accordance with some embodiments. In some embodiments, the method, process steps, or stages illustrated in the figures may be implemented as an independent routine or process, or as part of a larger routine or process. Note that each process step or stage depicted may be implemented as an apparatus that includes a processor executing a set of instructions, a method, or a system, among other embodiments. In some embodiments, the order of some of the steps may vary or be interchangeable. In some embodiments, the method 400 incorporates method 300 and enhances the 3D depth data provided by a 3D subsystem that may be included in the mobile device, such as, for example, mobile device 1 or mobile device 10.

In some embodiments, at operation 402, mobile device 1 captures a sequence of images using image capturing device 12. In some embodiments, mobile device 1 captures an image in the flash-based illumination environment for each flash unit, e.g., flash unit 31, flash unit 32, and flash unit 33 of the image capturing device 12. In some embodiments, mobile device 1 illuminates each flash unit of the flash units 3 sequentially as part of the process of taking or capturing an image. In some embodiments, each flash unit may be illuminated multiple times for each image, however, without loss of generality, the embodiments described herein are described with reference to a single flash unit being illuminated for each image.

In some embodiments, the sequence of images that have been illuminated by each flash unit and captured by the image capturing device 12 of mobile device 1 are collected at operation 403 and denoted as I=[I_1, I_2, I_3, . . . ]. In some embodiments, for the example illustrated in FIG. 1A, mobile device 1 includes three flash units, e.g., flash unit 31, flash unit 32, and flash unit 33, and the sequence of images illuminated by flash unit 31, flash unit 32, and flash unit 33 are denoted as I_1, I_2, and I_3, respectively. In some embodiments, the sequence of images I_1, I_2, and I_3 captured by the image capturing device 12 of mobile device 1, in addition to a 3D depth field associated with each image generated by 3D subsystem 18 described further herein, are provided to the illumination-based 3D enhancement system 41 of FIG. 1 for generation of the enhanced 3D depth images.

In some embodiments, at operation 410, illumination-based 3D enhancement system 41 of mobile device 1 receives the captured sequence of images and determines whether ambient lighting associated with each captured image exceeds an ambient lighting threshold. In some embodiments, the ambient lighting threshold is a threshold indicative of an excessive amount of ambient light associated with the captured images. In some embodiments, illumination-based 3D enhancement system 41 utilizes the excessive amount of ambient light associated with the captured images to improve the accuracy of the 3D depth field generated by the mobile device 1.

In some embodiments, when illumination-based 3D enhancement system 41 of mobile device 1 determines that the ambient lighting associated with each captured image does not exceed the ambient lighting threshold at operation 410, illumination-based 3D enhancement system 41 proceeds to operation 414 to determine whether stabilization of the sequence of images is required (discussed further herein with reference to operation 414). In some embodiments, at operation 411, when illumination-based 3D enhancement system 41 of mobile device 1 determines that the ambient lighting associated with each captured image exceeds the ambient lighting threshold at operation 410, mobile device 1 captures an ambient image, I_a, in the ambient environment of the captured image (e.g., ambient-based illumination environment) using image capturing device 12. In some embodiments, the ambient image is an image taken by image capturing device 12 without flash in the ambient-based illumination environment of the mobile device. In some embodiments, the ambient image represents a lighting condition that may be included in the set of lighting conditions that are used by illumination-based 3D enhancement system 41 to improve the accuracy of the 3D depth field. In some embodiments, when, for example, the mobile device has only one or two flash units, the inclusion of the additional ambient image to the captured sequence of images by the illumination-based 3D enhancement system 41 results in an improved enhanced 3D depth image. That is, in some embodiments, the additional lighting conditions (e.g., two or three lighting conditions) of the ambient light in the ambient images may be subtracted (as described herein with reference to operation 420) from the captured images and used to increase the robustness of the solution. In some embodiments, unlike the positions of the flash units on mobile device 1 or mobile device 10 which are in known locations, L, the positions of light source(s) in the ambient images are generally not known in advance. In some embodiments, however, mobile device 1 may use a range of methods to estimate the lighting source positions in the ambient images, such as, for example, observing the lighting source in the specular reflection of known objects, estimating the positioning of the lighting source using base 3D geometry estimated by the 3D subsystem before applying the enhancements, and using numerical methods (e.g., uncalibrated photometric stereo).

In some embodiments, at operation 412, mobile device 1 includes (or adds) the ambient image (I_a) to the sequence of captured images captured by the camera subsystem 15 of image capturing device 12. In some embodiments, at operation 414, illumination-based 3D enhancement system 41 of mobile device 1 determines whether stabilization of the captured sequence of images is required. In some embodiments, mobile device 1 determines whether stabilization of the sequence of images is required by comparing the frame rate during capture of each image to the rate of motion of the image capturing device 12. In some embodiment, when the image capturing device 12 captures frames rapidly with respect to the rate of motion, then stabilization is not required, the motion may be ignored, and method 400 proceeds to operation 418. In some embodiment, when the image capturing device 12 does not capture frames rapidly with respect to the rate of motion, then stabilization is required and method 400 proceeds to operation 416.

In some embodiments, at operation 416, when mobile device 1 determines that stabilization is required at operation 414, mobile device 1 utilizes the sequence of images taken under different lighting conditions to stabilize the images. In some embodiments, when the motion is sufficiently rapid, the motion is stabilized such that pixel (x,y) in, for example, each of I_1, I_2, I_3, represents the same object point. In some embodiments, mobile device 1 is configured to stabilize the images using an image stabilization algorithm or process, such as, for example, image flow or a full optical flow algorithm. In some embodiments, mobile device 1 is configured to stabilize the motion by finding the translation and rotation of the captured images that minimizes the motion. In some embodiments, the stabilized images are provided to operation 418 for further processing.

In some embodiments, at operation 418, when illumination-based 3D enhancement system 41 determines that stabilization is not required at operation 414 or after the sequence of images have been stabilized at operation 416, illumination-based 3D enhancement system 41 determines whether warping of the 3D depth data output by 3D subsystem 18 is required. In some embodiments, in order to determine whether warping of the images is required, mobile device 1 assesses whether image data output by image capturing device 12 is aligned with the 3D depth data output by the 3D subsystem 18.

In some embodiments, at operation 419, when the image data of the camera subsystem 15 that is used to capture the images is not aligned with the 3D depth data from the 3D subsystem 18, mobile device 1 warps the 3D depth image to align with the image data of the camera subsystem 15. In some embodiments, mobile device 1 is configured to warp the 3D depth image to the data associated with camera subsystem 15 by multiplying the 3D depth data with a projection matrix associated with the captured images, such that the 3D depth data exists in the space of the camera subsystem 15 used to obtain the normal image in method 300. In some embodiments, the warped images are provided to operation 420 for further processing.

In some embodiments, at operation 420, when an ambient image is included in the sequence of images, the ambient light of the ambient image I_a is cancelled mathematically from the images captured in the flash-based illumination environment by subtracting the ambient image I_a from each of the flash captured images I_1, I_2, I_3. For example, in some embodiments, with two images captured utilizing two flash units and one image captured using ambient lighting, a set of three images I_a, (I_1-I_a), (I_2-I-a) (which is sufficient for the three mathematical equations) may be utilized by illumination-based 3D enhancement system 41 to generate the enhanced 3D depth image. In some embodiments, after operation 420, illumination-based 3D enhancement system 41 proceeds to operation 421.

In some embodiments, at operation 421, illumination-based 3D enhancement system 41 of mobile device 1 utilizes method 300 to obtain a normalized image and per-pixel orientation estimations from the sequence of images captured by the camera subsystem 15 at operation 402 and operation 411.

In some embodiments, with further reference to FIG. 3, at operation 301, illumination-based 3D enhancement system 41 of mobile device 1 receives the sequence of images from operation 420 and proceeds to operation 303. In some embodiments, at operation 303, in order to determine a normal image generation method that is used to generate the normal image from the sequence of images, illumination-based 3D enhancement system 41 of mobile device 1 determines whether more than a predetermined number of flash units (e.g., are there more than three flash units used to generate more than three flashes) have been used to capture the images at operation 402. In some embodiments, illumination-based 3D enhancement system 41 of mobile device 1 is configured to determine the number of flashes that have been used to capture the images by assessing the number of flash units used for image capture.

In some embodiments, at operation 304, when illumination-based 3D enhancement system 41 determines that less than the predetermined number of flash units have been used to capture the images (e.g., two flash units generate one flash per image), the equations used to generate the normal image (e.g., Equation 1 and Equation 2 described further in detail below) may not have a single solution and instead may have an infinite set (multiple) of solutions as the system is considered under constrained. In some embodiments, rather than consider the infinite set of solutions "unsolvable", illumination-based 3D enhancement system 41 of mobile device 1 selects a solution from the infinite set of solutions and uses the selected solution to generate the enhanced 3D depth field. In some embodiments, the selected solution may be treated by illumination-based 3D enhancement system 41 of mobile device 1 as a new source of error (similar to noise) and used by method 400 to correct the incorrect orientation estimates. In some embodiments, the incorrect solution may be utilized by mobile device 1 as an estimate of inv(L) in Equation 2 and thus the selected solution is utilized to obtain a normal image of the sequence of images. In some embodiments, at operation 304, the normal image is generated from the sequence of images using, for example, matrix inversion or a linear system solver (described further in detail below).

In some embodiments, at operation 304, in order to generate the normal image, illumination-based 3D enhancement system 41 computes a normal, N, for each pixel in the sequence of images received from operation 421. In some embodiments, illumination-based 3D enhancement system 41 is configured to utilize Equation 1 and Equation 2 (exemplified below) to compute the normal for each image pixel and approximate the lighting on the surface of the subject or subjects of each image. In some embodiments, the surface-normal at each pixel in an image may be estimated by measuring the observed brightness of each pixel in the image. In some embodiments, by measuring the observed brightness of each pixel in an image (e.g., the captured image), illumination-based 3D enhancement system 41 is configured to estimate the surface normal at each pixel. In some embodiments, the Equation 1 that is used to determine a lighting surface approximation and normal computation is:

$$I = N * L \qquad \text{Equation 1}$$

where I is the observed image, N is the surface normal (orientation), and L is the lighting direction vector.

In some embodiments, when, for example, three images are captured as a sequence of images by image capturing device 12 using the flash unit 31, flash unit 32, and flash unit 33, the three images are captured under three different lighting conditions and yield three separate approximations, each producing a constraint on N as follows:

$$I\_1 = N * L\_1$$

$$I\_2 = N * L\_2$$

$$I\_3 = N * L\_3$$

In some embodiments, illumination-based 3D enhancement system 41 of mobile device 1 utilizes Equation 2 to obtain the normal, N:

$$N = I * inv(L) \qquad \text{Equation 2}$$

In some embodiments, at operation 304, illumination-based 3D enhancement system 41 of mobile device 1 applies Equation 2 to the received images in order to obtain the normal image. In some embodiments, the normal image is an image of which each pixel contains an estimate of the normal of the surface at the position associated with the pixel. In some embodiments, illumination-based 3D enhancement system 41 computes the normal image (normal for each pixel) from the sequence of images using matrix inversion (e.g., Equation 2). In some embodiments, the normal image generated by operation 304 is provided to operation 307 to be normalized and used in method 400 of FIG. 4A and FIG. 4B to generate the depth fields associated with the enhanced 3D depth images.

In some embodiments, at operation 305, when mobile device 1 determines that more than three flash units have been used for image capture at operation 303, mobile device 1 utilizes the pseudo-inverse normal image generation method (or a least square solver) to generate the normal image. In some embodiments, the pseudo-inverse normal generation method is a pseudo-inverse method that determines the pseudo-inverse of the lighting direction vector L exemplified in Equation 2 to generate a normal image that is provided to operation 307. In some embodiments, a least squares method may be utilized by illumination-based 3D enhancement system 41 to attain a unique solution for processing of the normal image. In some embodiments, the least squares method is used to solve an over constrained system (e.g., for more than three flashes).

In some embodiments, at operation 307, illumination-based 3D enhancement system 41 normalizes the normal image provided at operation 304 or operation 305 to generate a normalized image. In some embodiments, the normalized image is a normal image with each normal vector scaled to unit length. In some embodiments, at operation 309, illumination-based 3D enhancement system 41 provides the normalized image to operation 422 of method 400.

In some embodiments, as stated previously with reference to FIG. 3, each normal image obtained at operation 304 or operation 305 is an image in which each pixel contains an estimate of the normal of the surface at the position associated with the pixel. In some embodiments, each estimate of the orientation generally includes noise that, if not corrected using, for example, method 400, yields a corrupted 3D depth image, such as, the 3D depth image depicted in FIG. 5A.

In some embodiments, at operation 422, illumination-based 3D enhancement system 41 of mobile device 1 computes an enhanced 3D depth field using the normalized image generated using method 300 and the 3D depth field generated by 3D subsystem 18. In some embodiments, mobile device 1 is configured to compute the enhanced 3D depth field by using an illumination-based optimization framework (illustrated by way of example in Equation 3 below) that incorporates the 3D depth data measured by the 3D subsystem 18 and the normal data provided in the normal image generated using method 300. In some embodiments, Equation 3 of the illumination-based optimization framework may be represented as:

$$\min D\_i : (D\_i - D\_0)^2 + (N\_i - N\_\text{measured})^2 \qquad \text{Equation 3}$$

where D_i is the new enhanced depth field, D_0 is depth data from the 3D subsystem, N_i is the implied normal field, and N_measured is the measured normal image. In some embodiments, mobile device 1 is configured to calculate the normal field N_i using the 3D depth data from the 3D subsystem D_0. In some embodiments, mobile device 1 is configured to calculate the implied normal field N_i using standard geometry traditionally utilized to calculate a normal field from 3D depth data. In some embodiments, illumination-based 3D enhancement system 41 is configured to calculate N_measured using method 300.

In some embodiments, illumination-based 3D enhancement system 41 of mobile device 1 determines the enhanced 3D depth field D_i by solving the illumination-based optimization framework using numerical methods that are traditionally used to solve optimization functions. In alternate embodiments, other illumination-based optimization functions may be modified to incorporate the 3D depth data measured by the 3D subsystem 18 and the normal data provided in the normal image from method 300 and generate the enhanced 3D depth field. In some embodiments, the illumination-based optimization framework may be modified to include terms to adjust the weight given to the depth image and the normal map, rather than equate the weights given to the depth image and the normal map, as is the case in Equation 3. In some embodiments, use of the illumination-based optimization framework minimizes error in both terms, e.g., the 3D depth data and the normal data. In some embodiments, the resulting 3D depth field generated using method 400 is the new enhanced 3D depth field that is used to generate the enhanced 3D depth image displayed or output by mobile device 1. In some embodiments, the enhanced 3D depth image produced using the enhanced depth field generated by method 400 is a substantial improvement over 3D depth field produced by the 3D subsystem 18, as illustrated by inspection of the 3D depth images of FIG. 5A and FIG. 5B.

FIGS. 5A-5B provide a visual example of the improvement to a 3D depth image utilizing method 400. In some embodiments, the 3D depth data used to generate the 3D depth image in FIG. 5A was generated using, for example, a dual lens passive stereo 3D subsystem, and the enhanced 3D depth image in FIG. 5B illustrates the 3D depth data after enhancement using method 400.

In alternate embodiments, illumination-based 3D enhancement system 41 may generate the enhanced 3D depth image using a direct depth modification rather than, for example, a direct use of the illumination-based optimization framework, as is the case in method 400 of FIGS. 4A and 4B. In some embodiments, when, for example, the mobile device is limited in computational capabilities (e.g., the methods or processes are too computationally intensive for the mobile device) or only a single flash unit is available to flash the image captured by the camera subsystem, direct depth modification may be utilized by illumination-based 3D enhancement system 41.

In some embodiments, a key observation in utilizing direct depth modification, is that changes in the surface normal correspond to changes in lighting and thus changes in image intensity in the measured images I_1, I_2, I_3. In methods 300 and 400, changes in intensity are used to obtain a normal image. In some embodiments, however, the changes in intensity may be used in alternative ways. For example, in some embodiments, the gradient of change of image intensity may be assumed to be related to the gradient of change in the underlying 3D geometry. As a result, in some embodiments, the gradient image may be calculated and interpreted by mobile device 1 as a height field delta_D.

In some embodiments, in order to calculate the enhanced 3D depth using the direct depth modification, mobile device 1 calculates the enhanced 3D depth as D_i=D_0+delta_D, where D_0 is D_0 is depth data from the 3D subsystem and delta_D is the height field. In some embodiments, the direct depth modification method is less computationally intensive than other more complex methods, as the direct depth modification does not require the processing of the amount of data required in more complex methods.

In some embodiments, a benefit of the embodiments described herein is that a "regular" photography camera of a mobile device may be configured to utilize method 400 and generate the enhanced 3D depth image. In some embodiments, mobile device 10 may be used to perform the operations described herein.

Figure 6:
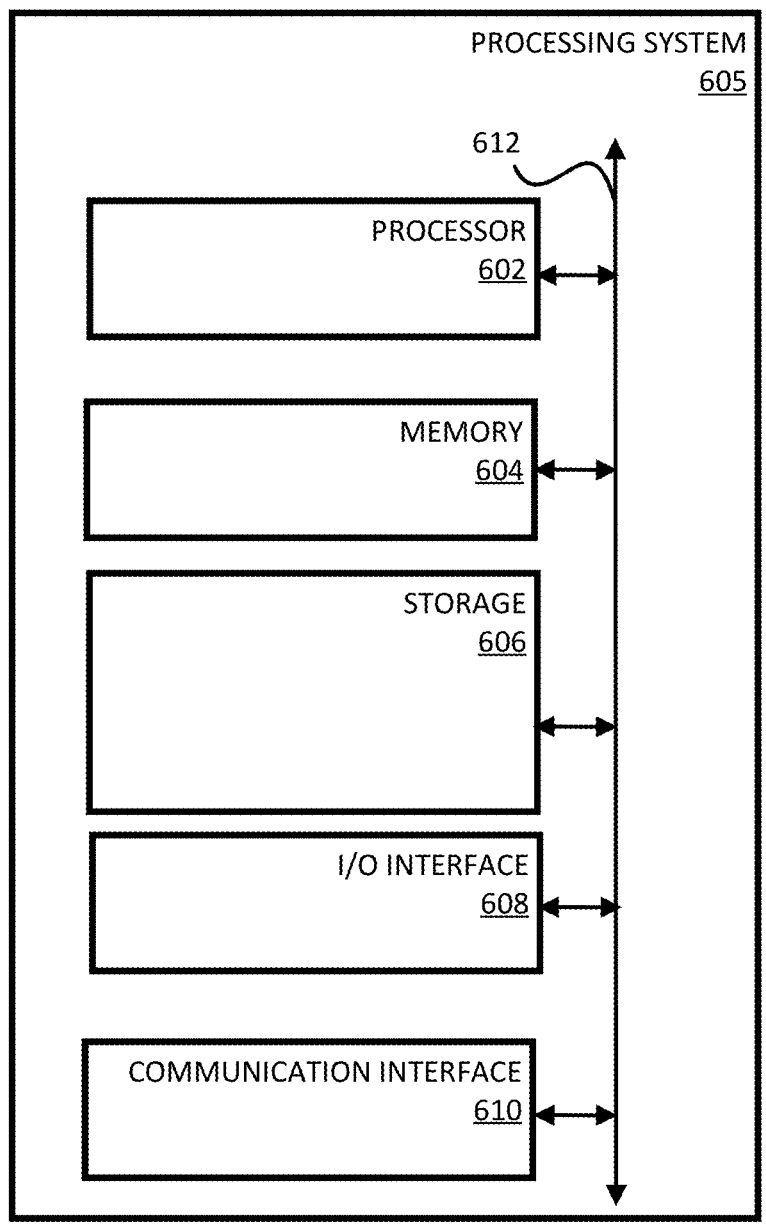
FIG. 6 illustrates a processing system in accordance with some embodiments.

FIG. 6 illustrates an example processing system 605 that is used to generate the enhanced 3D depth image in accordance with some embodiments. In some embodiments, one or more processing systems 605 may perform one or more steps of one or more methods described or illustrated herein. In particular embodiments, one or more processing systems 605 provide functionality described or illustrated herein. In particular embodiments, software running on one or more processing systems 605 performs one or more steps of one or more methods described or illustrated herein or provides functionality described or illustrated herein. Particular embodiments include one or more portions of one or more processing systems 605. Herein, reference to a computer system may encompass a computing device, and vice versa, where appropriate. Moreover, reference to a computer system may encompass one or more computer systems, where appropriate.

This disclosure contemplates any suitable number of processing systems 605. This disclosure contemplates processing system 605 taking any suitable physical form. As example and not by way of limitation, processing system 605 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, processing system 605 may include one or more processing systems 605; be unitary or distributed; span multiple locations; span multiple machines; span multiple data centers; or reside in a cloud, which may include one or more cloud components in one or more networks. Where appropriate, one or more processing systems 605 may perform without substantial spatial or temporal limitation one or more steps of one or more methods described or illustrated herein. As an example and not by way of limitation, one or more processing systems 605 may perform in real time or in batch mode one or more steps of one or more methods described or illustrated herein. One or more processing systems 605 may perform at different times or at different locations one or more steps of one or more methods described or illustrated herein, where appropriate.

In some embodiments, processing system 605 includes a processor 602, memory 604, storage 606, an input/output (I/O) interface 608, a communication interface 610, and a bus 612. In some embodiments, the processing system described herein may be considered a computer system. Although this disclosure describes and illustrates a particular computer system having a particular number of particular components in a particular arrangement, this disclosure contemplates any suitable computer system having any suitable number of any suitable components in any suitable arrangement.

In some embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In some embodiments, memory 604 includes main memory for storing instructions for processor 602 to execute or data for processor 602 to operate on. As an example and not by way of limitation, processing system 605 may load instructions from storage 606 or another source (such as, for example, another processing system 605) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In some embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to processing system 605, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In some embodiments, I/O interface 608 includes hardware, software, or both, providing one or more interfaces for communication between processing system 605 and one or more I/O devices. Processing system 605 may include one or more of these I/O devices, where appropriate. One or more of these I/O devices may enable communication between a person and processing system 605. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. In some embodiments, I/O devices may include a camera configured to digitally capture images. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In some embodiments, communication interface 610 includes hardware, software, or both providing one or more interfaces for communication (such as, for example, packet-based communication) between processing system 605 and one or more other processing systems 605 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, processing system 605 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, processing system 605 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Processing system 605 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In some embodiments, bus 612 includes hardware, software, or both coupling components of processing system 605 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

As described herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some embodiments, mobile device 1 may include static or non-volatile memory capable of storing program code and data. In some embodiments, the 3D subsystem 18 may be integrated into mobile device 1 and the components of the 3D subsystem 18 may perform conventional camera functions.

In some embodiments, mobile device 1 may utilize an additional number of lenses and flash units other than those illustrated in FIG. 1A to generate the enhanced 3D depth image. In some embodiments, although mobile device 1 includes three flash units, mobile device 1 may include one or two flash units. In some embodiments, a single lens (e.g., lens 21) may be used for conventional photography, while an alternate lens (e.g., lens 22) may be used to generate 3D depth information that is used to generate the enhanced 3D depth image. In some embodiments, illumination-based 3D enhancement system 41 of mobile device 1 determines whether there are three or more flash units.

In some embodiments, common camera elements not included in the 3D subsystem 18 may be used to enhance 3D quality of the 3D depth images generated by mobile device 1. In some embodiments, the quality of the 3D depth sensing provided by the mobile device 1 is improved by adding flash units to the mobile device 1 that are utilized to generate the enhanced 3D depth image using the methods described herein. In some embodiments, flash unit 3 may refer to one or more flash units, such as, for example, flash unit 31, flash unit 32, and flash unit 33, that are mounted on an image capturing device 12 of the mobile device 1. In some embodiments, mobile device 1 implements methods that use information obtained through successive firings of each of flash units 13 (e.g., flash unit 31, flash unit 32, and flash unit 33) to generate 3D depth data about an object in the field of view of lens 21, lens 22, and/or lens 23. In some embodiments, the 3D subsystem may be referred to as a "base 3D subsystem".

In some embodiments, although Equation 1 is utilized to approximate the lighting on the surface of the subject or subjects of each image and utilized used to compute the normal for each image, other approximations may be used to approximate the lighting on the surface of subject/s and compute the normal for each image.

In some embodiments, the data associated with the images captured by camera subsystem may include additional noise. In some embodiments, the noise may be caused by circumstances related to, for example, when a 3D object being captured using the mobile device 1 is positioned at an increased distance from the mobile device 1, when the 3D object captured using mobile device 1 has features smaller than a single pixel (e.g., hair), when the 3D object being captured by the mobile device 1 is in a shadow of the lights, or when a surface of the 3D object is "too shiny". In some embodiments, as a result, without mobile device 1 using the methods described herein for 3D depth image enhancement, the general integration process used to generate traditional 3D depth images fail to produce correct 3D shape and result in the 3D depth images illustrated in FIG. 5A. That is, in existing photometric stereo methods, which use high quality cameras and carefully controlled conditions, the orientation of the surface can be integrated to obtain the 3D depth of the surface directly. In some embodiments, however, the direct photometric stereo method generally may not provide adequate 3D depth images for mobile devices, in that the 3D depth images generated are generally corrupt as illustrated in FIG. 5A.

In some embodiments, during the design of mobile device 1, when, for example, there are less than three flash units being used to generate the depth images, the flash units may be configured such that the spacing distance between the flash units is as "wide" as practical (with a spacing distance greater than a spacing distance threshold), rather than close together (with a spacing distance below a spacing distance threshold). In some embodiments, the placement of flash units in mobile device 1 at a distance greater than the spacing distance threshold (e.g., further apart than typical flash units) may serve as an indication for mobile device 1 that the mobile device 1 may be used for enhancing 3D depth.

In some embodiments, a computer-implemented method includes capturing an image for each flash unit of an electronic device, each image being illuminated during the capturing of the image; obtaining a normalized image from one or more of the illuminated images; and using an illumination-based optimization framework to generate an enhanced three-dimensional (3D) depth image, the illumination-based optimization framework being based on the illuminated image.

In some embodiments of the computer-implemented method, the illumination-based optimization framework incorporates the normalized image and 3D depth data associated with the image into the generation of the enhanced 3D depth image.

In some embodiments, the computer-implemented method further includes generating an enhanced 3D depth field as part of the illumination-based optimization framework, the enhanced 3D depth field being generated based on the normalized image and the 3D depth data.

In some embodiments of the computer-implemented method, each pixel in the normalized image includes an orientation estimation of a surface point corresponding to the pixel in the image.

In some embodiments, the computer-implemented method further includes determining whether more than a predetermined number of flash units were utilized for illumination of each image during the capturing of each image for each flash unit.

In some embodiments, the computer-implemented method further includes, when more than the predetermined number of flash units were utilized for illumination of each image during the capturing of each image for each flash unit, using a pseudo-inverse processing technique to obtain the normal image.

In some embodiments, the computer-implemented method further includes determining whether ambient light associated with the image exceeds an illumination threshold.

In some embodiments, the computer-implemented method further includes, when the ambient light exceeds the illumination threshold, capturing an ambient image without an illumination provided by the flash unit; and using the ambient image to generate the enhanced 3D depth image.

In some embodiments, the computer-implemented method further includes determining whether the stabilization of each image is required by the electronic device.

In some embodiments, the computer-implemented method further includes, when a stabilization of each image is required by the electronic device, using a sequence of images captured by the electronic device to stabilize each image of the sequence of images.

In some embodiments, the computer-implemented method further includes determining whether warping of the 3D depth data is required by the electronic device.

In some embodiments, the computer-implemented method further includes, when warping of the 3D depth data is required by the electronic device, warping the 3D depth data to align with the illuminated image.

In some embodiments, a system includes a processor; and a memory in communication with the processor for storing instructions, which when executed by the processor causes the system to: capture an image for each flash unit of an electronic device, each image being illuminated during the capturing of the image; obtain a normalized image from a sequence of illuminated images; and use an illumination-based optimization framework to generate an enhanced three-dimensional (3D) depth image, the illumination-based optimization framework being based on the illuminated image.

In some embodiments of the system, the illumination-based optimization framework incorporates the normalized image and 3D depth data associated with the image into the generation of the enhanced 3D depth image.

In some embodiments of the system, an enhanced 3D depth field is generated as part of the illumination-based optimization framework, the enhanced 3D depth field being generated based on the normalized image and the 3D depth data.

In some embodiments of the system, each pixel in the normalized image includes an orientation estimation of a surface point corresponding to the pixel in the image.

In some embodiments of the system, based upon a determination by the system of whether more than a predetermined number of flash units were utilized for illumination purposes during the capture of each image for each flash unit, a pseudo-inverse processing technique is used to obtain the normal image.

In some embodiments, a device includes a three-dimensional (3D) subsystem; and a camera subsystem coupled to the 3D subsystem, wherein, based upon an illumination of images captured by the camera subsystem, 3D depth data output by the 3D subsystem is enhanced to generate an enhanced 3D depth image.

In some embodiments of the device, an enhanced 3D depth field is utilized to generate the enhanced 3D depth image, the enhanced 3D depth field being generated by incorporating a normalized image with the 3D depth data output by the 3D subsystem.

In some embodiments of the device, an ambient image is captured by the camera subsystem without flash-based illumination, the ambient image being added to a set of captured images to generate the enhanced 3D depth image.

What is claimed is:

1. A computer-implemented method, comprising:
   capturing an image for each flash unit of an electronic device, each image being illuminated during the capturing of the image;
   obtaining a normalized image from one or more of the illuminated images;
   using an illumination-based optimization framework to generate an enhanced three-dimensional (3D) depth image, the illumination-based optimization framework being based on the one or more of the illuminated images, wherein the illumination-based optimization framework incorporates the normalized image and 3D depth data associated with the image into the generation of the enhanced 3D depth image;
   generating an enhanced 3D depth field as part of the illumination-based optimization framework, the enhanced 3D depth field being generated based on the normalized image and the 3D depth data, wherein each pixel in the normalized image includes an orientation estimation of a surface point corresponding to the pixel in the image;
   determining whether more than a predetermined number of flash units were utilized for illumination of each image during the capturing of each image for each flash unit; and
   when more than the predetermined number of flash units were utilized for illumination of each image during the capturing of each image for each flash unit, using a pseudo-inverse processing technique to obtain the normal image.

2. The computer-implemented method of claim 1, further comprising:
   determining whether ambient light associated with the image exceeds an illumination threshold.

3. The computer-implemented method of claim 2, further comprising:
   when the ambient light exceeds the illumination threshold, capturing an ambient image without an illumination provided by the flash unit; and
   using the ambient image to generate the enhanced 3D depth image.

4. The computer-implemented method of claim 3, further comprising:
   determining whether the stabilization of each image is required by the electronic device.

5. The computer-implemented method of claim 4, further comprising:
   when a stabilization of each image is required by the electronic device, using a sequence of images captured by the electronic device to stabilize each image of the sequence of images.

6. The computer-implemented method of claim 5, further comprising:
   determining whether warping of the 3D depth data is required by the electronic device.

7. The computer-implemented method of claim 6, further comprising:
   when warping of the 3D depth data is required by the electronic device, warping the 3D depth data to align with the one or more of the illuminated images.

8. A system, comprising;
   a processor; and
   a memory in communication with the processor for storing instructions, which when executed by the processor causes the system to:
   capture an image for each flash unit of an electronic device, each image being illuminated during the capturing of the image;
   obtain a normalized image from a sequence of illuminated images; and
   use an illumination-based optimization framework to generate an enhanced three-dimensional (3D) depth image, the illumination-based optimization framework being based on the illuminated image, wherein the illumination-based optimization framework incorporates the normalized image and 3D depth data associated with the image into the generation of the enhanced 3D depth image and
   wherein an enhanced 3D depth field is generated as part of the illumination-based optimization framework, the enhanced 3D depth field being based on the normalized image and the 3D depth data and wherein each pixel in the normalized image includes an orientation estimation of a surface point corresponding to the pixel in the image and wherein based upon a determination by the system of whether more than a predetermined number of flash units were utilized for illumination purposes during the capture of each image for each flash unit, a pseudo-inverse processing technique is used to obtain the normal image.

* * * * *